(12) United States Patent
Rolion et al.

(10) Patent No.: US 11,727,647 B2
(45) Date of Patent: Aug. 15, 2023

(54) METHOD AND KIT FOR APPLYING TEXTURE IN AUGMENTED REALITY

(71) Applicant: Societe BIC, Clichy (FR)

(72) Inventors: Franck Rolion, Asniere sur Oise (FR); Etienne Roudaut, La Garenne Colombes (FR)

(73) Assignee: SOCIÉTÉ BIC, Clichy (FR)

( * ) Notice: Subject to any disclaimer, the term of this patent is extended or adjusted under 35 U.S.C. 154(b) by 266 days.

(21) Appl. No.: 16/622,775

(22) PCT Filed: Jun. 19, 2018

(86) PCT No.: PCT/FR2018/051457
§ 371 (c)(1),
(2) Date: Feb. 19, 2021

(87) PCT Pub. No.: WO2018/234677
PCT Pub. Date: Dec. 27, 2018

(65) Prior Publication Data
US 2021/0248823 A1   Aug. 12, 2021

(30) Foreign Application Priority Data
Jun. 19, 2017 (FR) ..................... 1755538

(51) Int. Cl.
*G06T 19/00* (2011.01)
*G06T 15/04* (2011.01)
(Continued)

(52) U.S. Cl.
CPC ............ *G06T 19/006* (2013.01); *G06T 15/04* (2013.01); *G06T 15/20* (2013.01); *G06T 19/20* (2013.01);
(Continued)

(58) Field of Classification Search
None
See application file for complete search history.

(56) References Cited

U.S. PATENT DOCUMENTS

| 9,552,674 B1* | 1/2017 | Jayadevaprakash .. G06F 3/0304 |
| 2008/0071559 A1* | 3/2008 | Arrasvuori ............. G06F 3/011 |
| | | 705/26.1 |

(Continued)

FOREIGN PATENT DOCUMENTS

| DE | 10301849 A1 | 8/2004 |
| EP | 1720131 A1 | 8/2006 |
| EP | 2747034 A2 | 6/2014 |

OTHER PUBLICATIONS

Heisenberg, G. et al., "Arm prosthesis simulation on a virtual reality L-shaped workbench display system using a brain computer interface," Proceedings 10th International Conference on Disability, Virtual Reality and Associated Technologies, Gothenburg, Sweden, Sep. 2, 2017, pp. 109-117.
(Continued)

*Primary Examiner* — Michael J Cobb
(74) *Attorney, Agent, or Firm* — Bookoff McAndrews, PLLC

(57) ABSTRACT

A method and kit for applying texture in augmented reality including the steps of acquiring a real-world image in which a real object and at least a portion of a marker linked to the real object are visible; detecting the marker; registering a virtual world with the real world on the basis of the marker detection; positioning a three-dimensional virtual object in such a way that, in the virtual world, the virtual object is substantially overlaid over the real object in the real world; applying a texture to the three-dimensional virtual object; and displaying at least the texture applied to the three-dimensional virtual object.

16 Claims, 11 Drawing Sheets

(51) Int. Cl.
  *G06T 15/20* (2011.01)
  *G06T 19/20* (2011.01)
  *G06T 17/20* (2006.01)
(52) U.S. Cl.
  CPC .... *G06T 17/205* (2013.01); *G06T 2219/2004* (2013.01)

(56) References Cited

U.S. PATENT DOCUMENTS

| | | | | |
|---|---|---|---|---|
| 2012/0218263 | A1* | 8/2012 | Meier | G06T 19/006 345/419 |
| 2013/0083008 | A1* | 4/2013 | Geisner | A63F 13/67 345/419 |
| 2013/0328925 | A1* | 12/2013 | Latta | G06F 3/017 345/633 |
| 2014/0132629 | A1* | 5/2014 | Pandey | G02B 27/017 345/633 |
| 2014/0210947 | A1* | 7/2014 | Finn | G06T 19/006 348/46 |
| 2014/0247279 | A1* | 9/2014 | Nicholas | G06T 19/006 345/633 |
| 2014/0272773 | A1* | 9/2014 | Merritt | A61C 19/04 433/29 |
| 2016/0189288 | A1* | 6/2016 | Todeschini | G06K 7/1413 705/27.2 |
| 2016/0196692 | A1* | 7/2016 | Kjallstrom | G06F 3/0346 345/633 |
| 2017/0219498 | A1* | 8/2017 | Chtcheprov | G01T 1/2978 |
| 2017/0236332 | A1* | 8/2017 | Kipman | G06T 19/006 345/633 |
| 2021/0192256 | A1* | 6/2021 | Coimbra De Andrade | G06V 10/56 |
| 2021/0350573 | A1* | 11/2021 | Kalra | G06T 19/20 |
| 2021/0405654 | A1* | 12/2021 | Ulun | G06T 7/70 |
| 2022/0198762 | A1* | 6/2022 | Komoriya | G06T 7/70 |

OTHER PUBLICATIONS

Herve, J.-Y. et al., "Dynamic registration for augmented reality in telerobotics applications," IEEE International Conference on Systems, Man, and Cybernetics, Piscataway, NJ, Oct. 8-11, 2000, pp. 1348-1353.

Fiala, M., "Comparing ARTag and ARToolkit Plus fiducial marker systems," IEEE International Workshop on Haptic Audio Visual Environments and their Applications, Piscataway, NJ, Oct. 1, 2005, pp. 147-152.

International Search Reported issued in PCT/FR2018/051457, dated Nov. 8, 2018 (6 pages) with English translation (3 pages).

\* cited by examiner

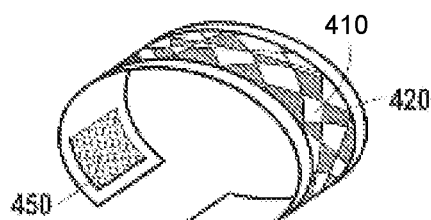
FIG.4C
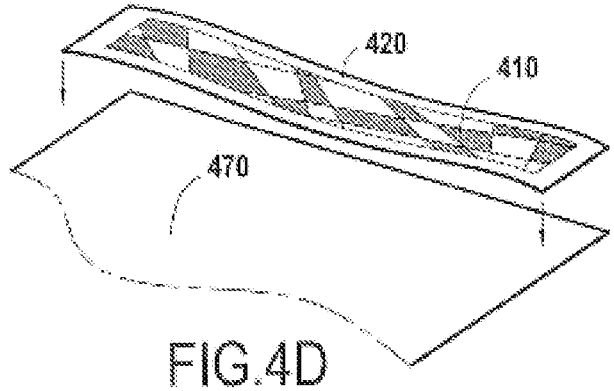
FIG.4D
FIG.4E
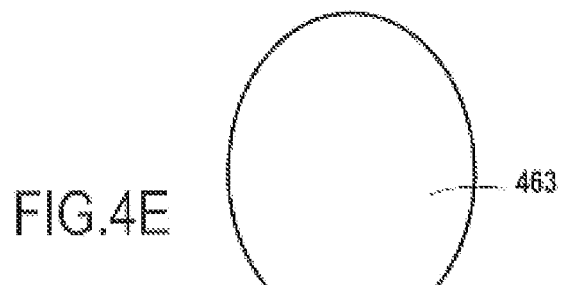
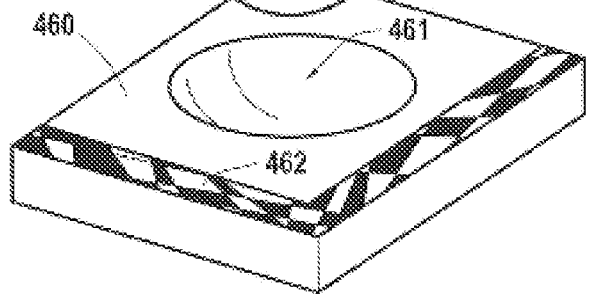
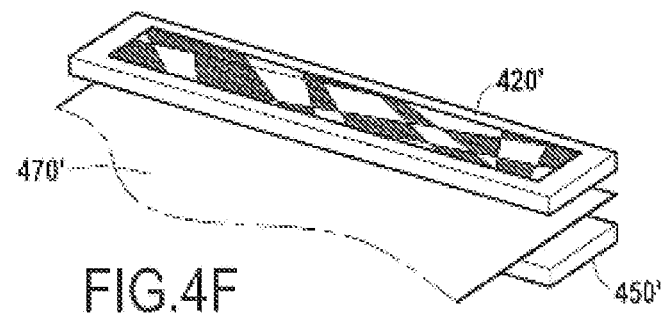
FIG.4F

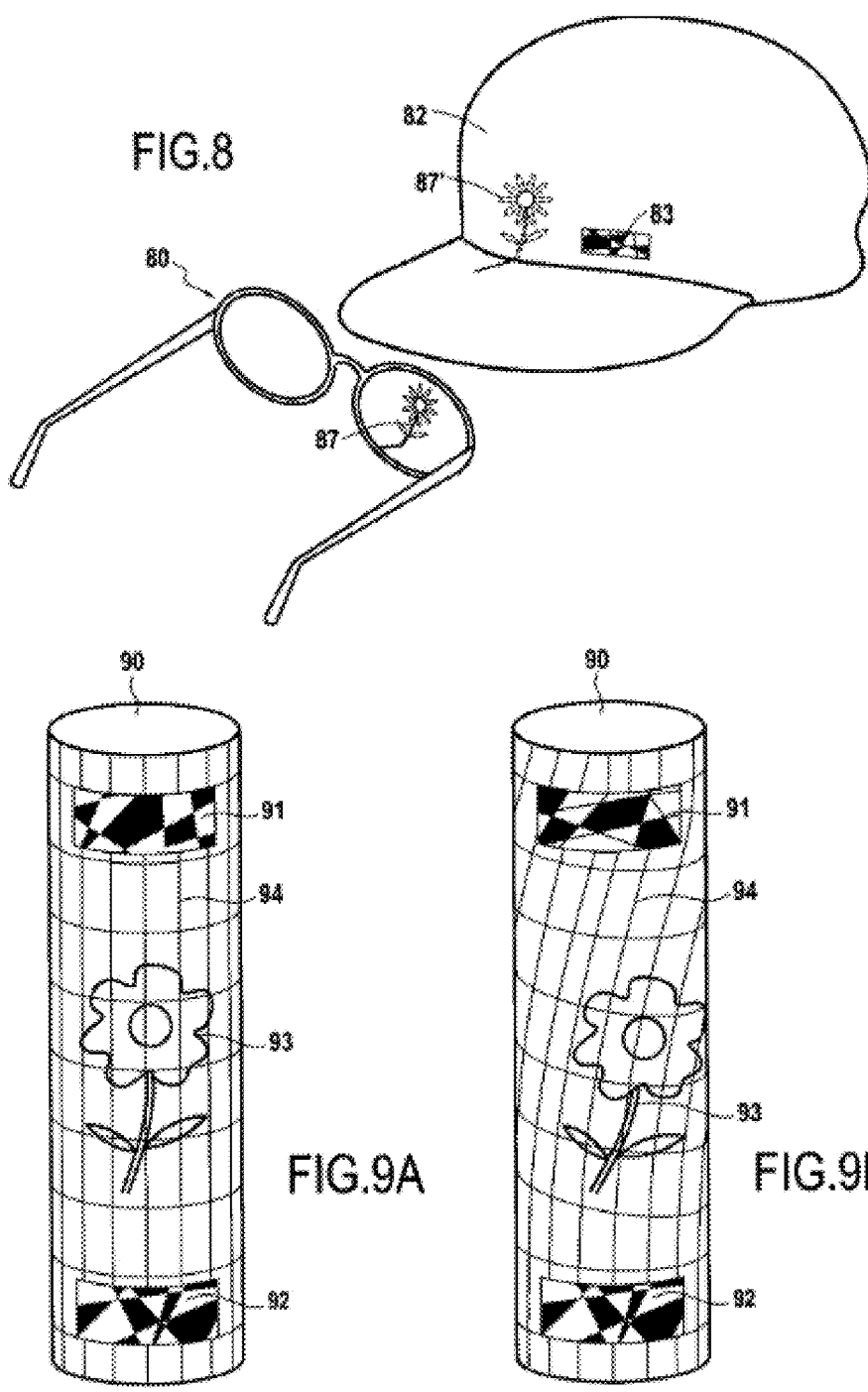

METHOD AND KIT FOR APPLYING TEXTURE IN AUGMENTED REALITY

CROSS REFERENCE TO RELATED APPLICATION(S)

This application is a National Stage Application of International Application No. PCT/FR2018/051457, filed on Jun. 19, 2018, now published as WO2018234677, and which claims priority to French Application No. FR1755538, filed Jun. 19, 2017.

BACKGROUND

The disclosure relates to the general field of augmented reality, and more specifically to the application of textures in augmented reality.

Augmented reality is a technology that may consist in overlaying, possibly in real time, virtual images or complementary information on images originating from the real world.

For example, augmented reality makes it possible to display virtual objects such that they seem to appear in the real world. This results from using a display module such as a screen, where an image of a virtual object can be overlaid on a real-world image (acquired for example by a camera). Alternatively, it is possible to use a display module such as "Microsoft HoloLens" (registered trade mark) augmented reality glasses for displaying a virtual object that the user will see as though it were placed in the real world.

An example of use of augmented reality is that of viewing a virtual item of furniture arranged such that it can be seen by a user at a location in a room.

The current augmented reality techniques only allow for viewing of objects, and do not make it possible to perform a preview which would make the action on a real object sufficiently easier for a user.

There is therefore a need for new applications in augmented reality.

The disclosure aims in particular to overcome these disadvantages.

SUMMARY

The present disclosure meets this need by proposing a method of applying texture in augmented reality, the method comprising:
  acquisition, by an image acquisition module, of a real-world image on which a real object and at least a portion of a marker linked to the real object are visible,
  detection of the at least one portion of the marker in the real-world image,
  registration of a virtual world with respect to the real world, on the basis of the detection of the at least one portion of the marker,
  placement of a three-dimensional virtual object in the registered virtual world, such that the virtual object is substantially overlaid, in the virtual world, on the real object in the real world,
  application of a texture on the three-dimensional virtual object,
  displaying at least the texture applied to the three-dimensional virtual object, the display being performed from a viewpoint in the virtual world that corresponds to the position of the image acquisition module in the real world.

The real world mentioned above refers to the three-dimensional space of users.

As for the virtual world, this is a three-dimensional space which exists only digitally. The virtual space may be associated with a, for example orthonormal, three-dimensional reference point. Therefore, the virtual space can be displayed on a display module (for example a screen or augmented reality glasses), from a viewpoint selected by using conventional three-dimensional imagery techniques that are well-known to a person skilled in the art.

The step of registration of a virtual world is intended for aligning the virtual world and the real world, such that a displayed object appears in a desired location, and even having a desired orientation and size.

It can be noted that the visible portion of the marker makes it possible to perform the registration step. The visible portion of the marker makes it possible to determine an orientation of the marker and also a dimension (for example a distance between two elements of the marker). From then on, the visible portion of the marker can be considered to be associated with a real-world reference point (for example an orthonormal reference point), and a virtual reference point will be developed on the basis of the real-world reference point. The virtual reference point thus developed allows for a virtual object to be displayed such that it appears at a desired location (for example once overlaid on a real-world image.

For example, if a point of the visible portion of the marker is selected as forming the origin of a real world reference point, then a point of a virtual object intended to be placed at the origin of the virtual-world reference point will be displayed as though it were present at the origin of the real-world reference point, and thus on the marker.

The application of texture uses techniques generally designated, by a person skilled in the art, as "texture mapping."

A person skilled in the art in particular knows how to apply textures to virtual three-dimensional objects such as three-dimensional meshes.

It will be noted that, since the three-dimensional virtual object selected has a shape similar to that of the real object, the displayed texture will be displayed as though it were applied to the real object observed from the image acquisition module. For example, the three-dimensional virtual object can be selected taking into account the real object.

This can in particular make it possible to facilitate the previewing of a drawing corresponding to the texture to be achieved on the real object, and this can also make it possible to facilitate a step of creating a drawing that corresponds to the texture on the real object.

Indeed, the method may comprise, following the display step, a display of creating a drawing on the real object, it being possible for the drawing to correspond to the texture.

The expression "in augmented reality" means "such that a user sees an overlay of a virtual element (in this case at least the texture) on a real-world image (which is for example either viewed directly by the user or displayed on a display module together with the texture)."

It can be noted that, since the method is a method for applying texture in augmented reality, it is implicit that, by means of the texture being displayed, an observer can see the texture as though overlaid on the real object.

By way of illustration, if the display step is performed by means of a screen, the image acquired could be displayed at the same time as the texture.

For example, and according to a particular embodiment, the method further comprises displaying the real-world image, the texture applied to the three-dimensional virtual object being displayed in a manner overlaid on the real-world image that is displayed.

The particular embodiment is particularly advantageous when the display step is implemented using a screen. The displayed texture appears as though it were present on the real object, insofar as the three-dimensional virtual object is selected so as to correspond to the real object.

However, the disclosure is in no way limited to the display of the acquired image, and it is also possible to achieve an application of texture in augmented reality without displaying the image acquired, for example by using a display such as augmented reality glasses, through which a user directly views the texture and the real world.

According to a particular embodiment, the three-dimensional virtual object is selected from a library of three-dimensional virtual objects.

Thus, a user can select a virtual object that has the shape closest to that of the real object. The three-dimensional virtual objects from the library of three-dimensional virtual objects may be meshes that are well-known to a person skilled in the art, or three-dimensional shapes associated with parameters. By way of illustration, a cylindrical three-dimensional shape having a circular base can be associated with a diameter parameter and a height parameter.

According to a particular embodiment, the method comprises a preliminary step of adjusting the three-dimensional virtual object.

The preliminary adjustment step can be performed after prior implementation of some steps of the method, in order to place a virtual object in the virtual world.

The preliminary adjustment step may comprise a display of the three-dimensional virtual object and if a screen is used for the display, the display of an acquired real-world image. The display of the three-dimensional virtual object can be achieved by displaying a partially opaque three-dimensional virtual object such that it is possible to view both the real object and the three-dimensional virtual object at the same time. If the three-dimensional virtual object is not perfectly overlaid on the real object, the user can easily see the deviations between the three-dimensional virtual object and the real object.

This adjustment may comprise a displacement, in the virtual world, of the three-dimensional virtual object, or a deformation of the three-dimensional virtual object in the virtual world.

According to a particular embodiment, the adjustment step is implemented by means of receiving a command from a user.

By way of illustration, this step can be implemented by means of an interface for the user.

According to a particular embodiment, the detection of the at least one portion of the marker comprises detection of a predefined number of particular points of the marker.

According to a particular embodiment, the predefined number of particular points is 3, or between 3 and 20, or between 20 and 50, or between 50 and 100, or even greater than 50.

The particular points may be visual nodes. For a person skilled in the art, a visual node is generally a break in a line or the end of a line. According to a particular embodiment, the marker is a non-repetitive pattern having a high black-and-white contrast ratio.

By way of illustration, if the marker is in gray-scale, and the color white is associated with a black intensity of 0% and the color black is associated with a black intensity of 100%, then a marker is used that has elements having a black intensity difference of at least 70 points, which corresponds to a high contrast ratio (for example, it is possible to use a gray at 15% black and a gray at 85% black, or a white at 0% black and a gray at 70% black).

It is also possible to use a colored pattern having colors associated with black intensities separated by 70 points (for example a pale yellow at 10% black and a dark blue at 80% black).

According to a particular embodiment, the texture is applied to the three-dimensional virtual object in a zone that is separate from that comprising the marker in the real world.

This particular embodiment facilitates the implementation of a subsequent step of drawing, because the marker and the elements thereof do not hinder this step.

It can be noted that "separate" is intended to mean a zone that is spaced apart from the marker by at least a distance of the order of a centimeter.

According to a particular embodiment, the texture is applied to a predefined portion of the three-dimensional virtual object, for example in a location selected by the user.

According to a particular embodiment, at least a portion of an additional marker linked to the real object is visible on the real-world image, the method further comprising:
  detection of the at least one portion of the additional marker in the real-world image,
  adjustment of the three-dimensional virtual object on the basis of the detection of the at least one portion of the additional marker.

Using two marker portions (for example belonging to two separate markers) makes it possible to further adjust the knowledge of the position of the real object and of the deformations thereof.

The present disclosure also proposes a method in which:
  a marker and a real object are linked,
  the method as defined above is performed using the marker and the real object.

According to a particular embodiment, the marker is provided on a mobile support, and the mobile support of the marker is linked to the real object.

According to a particular embodiment, the support is flexible and comprises means for attaching the support to itself or to an object. A support attached to itself allows for a loop to be formed, which surrounds an object.

According to a particular embodiment, when the support is attached to itself and to a real object, the marker is visible all around the real object.

In this case, the loop which has been formed makes it possible for the object to be turned, while allowing for detection of a portion of the marker.

According to a particular embodiment, the support is rigid and comprises means for attaching the support to itself or to an object.

The present disclosure also proposes an augmented reality system, comprising:
  a real world image acquisition module,
  a display module,
  a processor,
  a memory comprising instructions that can be executed by the processor for:
  acquiring, by means of the image acquisition module, a real-world image on which a real object and at least a portion of a marker linked to the real object are visible,
  detecting the at least one portion of the marker in the real-world image,
  registering a virtual world with respect to the real world, on the basis of the detection of the at least one portion of the marker, placing, in the registered virtual world, a three-dimensional virtual object, such that the virtual object is substantially overlaid, in the virtual world, on the real object in the real world, applying a texture on the three-dimensional virtual object, displaying, on the display module, at least the texture applied to the three-dimensional virtual object, the display being performed from a viewpoint in the virtual world that corresponds to the position of the image acquisition module in the real world.

The system can be configured for implementing each embodiment of the method as defined above.

The present disclosure also proposes a computer program comprising instructions for executing the steps of a method as defined above when the program is executed by a computer.

It should be noted that the computer programs mentioned in the present disclosure can use any programming language and be in the form of source code, object code or intermediate code between source code and object code, such as in a partially compiled form or in any other desired form.

The disclosure also proposes a recording medium that can be read by a computer on which a computer program is saved that comprises instructions for executing the steps of a test method as defined above.

The recording (or information) media in the present disclosure may be any entity or device that is capable of storing the program. For example, the medium may comprise a storage means, such as a ROM, for example a CD ROM or a ROM having a microelectronics circuit, or even a magnetic recording means, for example a floppy disc or a hard disc.

Alternatively, the recording media may correspond to a transmittable medium such as an electronic or optical signal, which can be sent via an electrical or optical cable, by radio, or by other means. The program according to the disclosure can in particular be downloaded from a network of the Internet type.

Alternatively, the recording media may correspond to an integrated circuit in which the program is incorporated, the circuit being designed to carry out or to be used in the carrying out the method in question.

The present disclosure also proposes a kit comprising information for obtaining a computer program as defined above, and a support on which a marker is provided, which marker can be used for carrying out the method as defined above.

By way of illustration, the information for obtaining the computer program may be a hypertext link (an Internet address), or a marker that makes it possible to obtain a hypertext link, such as a QR code.

The present disclosure also proposes a kit comprising information for obtaining a computer program as defined above, and a real object provided with a marker that can be used for carrying out the method as defined above.

The present disclosure also proposes a kit comprising information for obtaining a computer program as defined above, and a receptacle for receiving a real object on which a marker is provided, which marker can be used for carrying out the method as defined above when a real object is received in the receptacle.

BRIEF DESCRIPTION OF THE DRAWINGS

Other features and advantages of the present disclosure can be found in the following description, with reference to the accompanying drawings which illustrate a non-limiting example.

In the figures:

FIG. 4A to 4F show kits and elements of kits according to embodiments of the disclosure, FIG. 8 shows a variant in which the texture is displayed on augmented reality glasses, and FIGS. 9A and 9B are examples showing the use of two markers.

DETAILED DESCRIPTION

A method and a system according to a particular embodiment of the disclosure will now be described.

Figure 1:
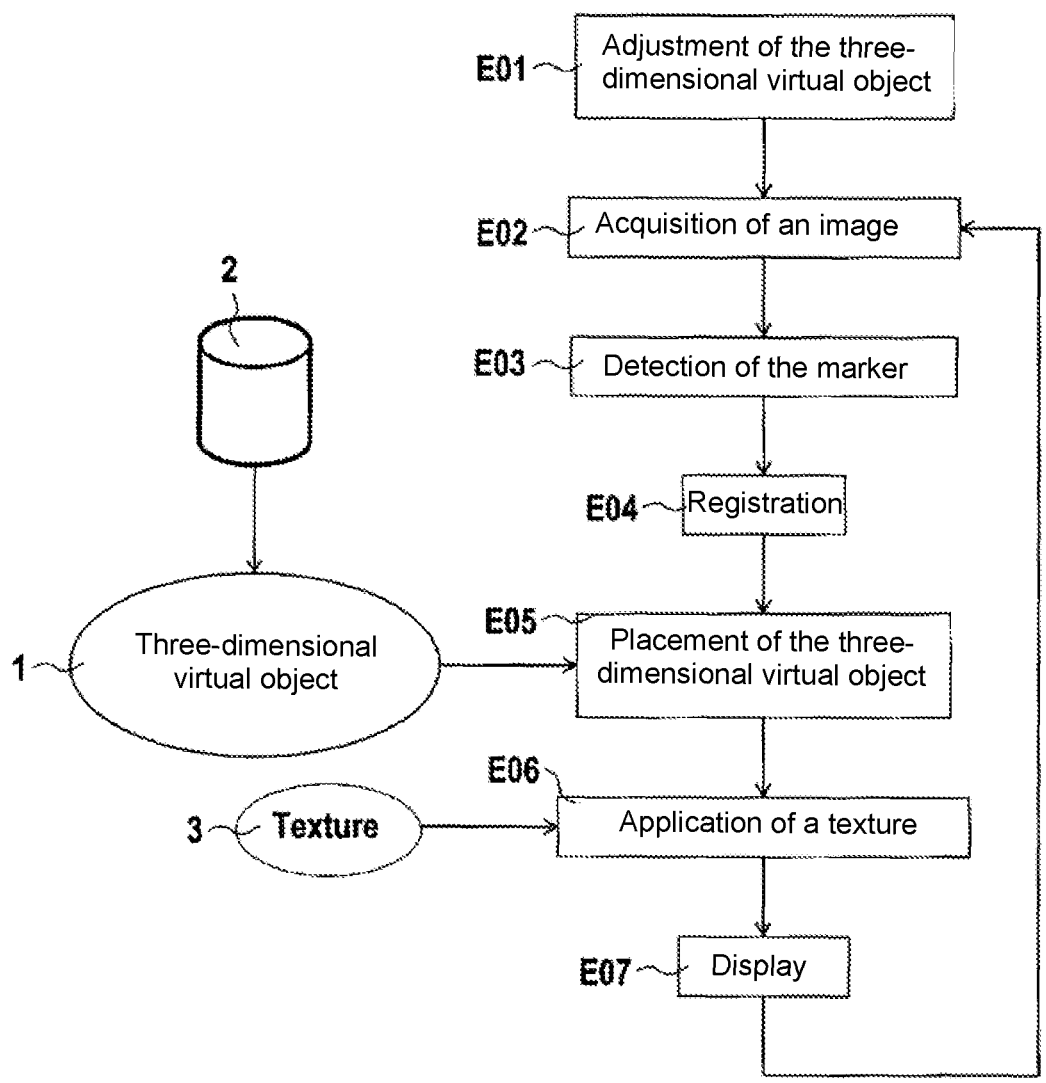
FIG. 1 schematically shows the steps of a augmented reality display method according to an embodiment of the disclosure, FIG. 2 schematically shows the steps of an adjustment of a three-dimensional virtual object, FIG. 3 schematically shows an augmented reality system according to a particular embodiment of the disclosure.

FIG. 1 schematically shows the steps of a method for applying texture in augmented reality.

This method can be implemented by a terminal such as a smartphone, a touchpad, or augmented reality glasses (such as the registered trade mark HoloLens). Indeed, this method can be implemented by any system equipped with an image acquisition module (for example a camera on the back of a smartphone), a display module (for example a smartphone screen), and a processor.

In the method, the texture is a drawing that it is desirable to view as though the drawing had been applied to a real object, for example but not exclusively a three-dimensional object that is different from a planar surface.

In a first step E01, a three-dimensional virtual object is adjusted in a virtual world. This preliminary step will be described in greater detail in the following, with reference to FIG. 2.

In a second step E02, a real-world image is acquired, on which a real object and at least a portion of a marker linked to the real object are visible.

"Linked" means that the marker is either fixed to the real object or that it forms part of the real object (for example if it has been printed underneath).

As will be understood, this embodiment of the disclosure relates to small real objects, for example objects having dimensions of the order of a meter or decimeter. The real object may also be a human body or a portion of a human body.

Regarding the marker, this must be selected so as to allow for registration of a virtual world relative to the real world. Therefore, a plurality of particular points of the marker may be able to be detected on the acquired image. The detection of at least a portion of the marker is performed in step E03.

It can be noted that the marker can also be denoted a "target." This term is used in particular in the context of the development kit ("SDK: Software Development Kit") known as Vuforia (registered trade mark), marketed by the American company PTC. Indeed, the marker may be a "target" that is accepted by the Vuforia development kit for augmented reality, for example version 6, dating from August 2016. In step E04, registration of a virtual world with respect to the real world is performed, on the basis of the detection of the portion of the marker. This step in particular makes it possible to determine the viewpoint of the image acquisition module that is used.

A three-dimensional virtual object 1 is then obtained. This object can be selected so as to be of the same shape as the real object, or at least a shape approximate thereto. For example, if the real object is a cup, a cylinder having a circular base can be selected as the three-dimensional virtual object. If the real object is a forearm, a cone can be selected as the three-dimensional virtual object.

Of course, the disclosure is in no way limited to three-dimensional canonical shapes, and applies to any three-dimensional shape. By way of illustration, the three-dimensional virtual object can be a mesh of any kind. For example, if the real object is a cup, for greater precision, a mesh representing a cup having a handle can be used.

In the embodiment of FIG. 1, the three-dimensional virtual object 1 is selected from a library of three-dimensional virtual objects 2. By way of illustration, the library of three-dimensional virtual objects 2 can be stored in a memory of the system that performs the method, or the library 2 may be stored on a remote server that is accessible via a network such as the Internet.

The virtual object 1 is placed in the virtual world registered in step E05. This placement is performed such that the virtual object is substantially overlaid, in the virtual world, on the real object in the real world.

In other words, if the virtual object is displayed on a display in augmented reality, the virtual object will be viewed instead and in the place of the real object. For this purpose, the respective position of the object of the three-dimensional virtual object relative to the position of the detected marker must be predefined. This respective position can be stored together with the three-dimensional virtual object, for example in the library 2.

Indeed, each three-dimensional virtual object can have a position, a size and an orientation which are linked to a portion of the marker.

Subsequently, during step E06, a texture 3 is applied to the three-dimensional virtual object. The texture may be a drawing selected by the user, for example a drawing that the user wishes to view on the real object.

Finally, in a step E7, at least the texture applied to the three-dimensional virtual object is displayed, the display being performed from a viewpoint in the virtual world that corresponds to the position of the image acquisition module in the real world.

It can be noted that, if step E07 is performed on a device equipped with a screen (for example a smartphone or a touchpad), the real-world image that has been acquired may be displayed. This is not necessary, however, if augmented reality glasses are used, because displaying only the texture allows the user to see this applied to the real object.

It can be noted that steps E02 to E07 can be repeated when a new real-world image is acquired. Processing of the new image makes it possible to follow the portion of marker (or "tracking"). Thus, a display is achieved, in real time, which can withstand the movements of the camera or the movements of the object.

Figure 2:
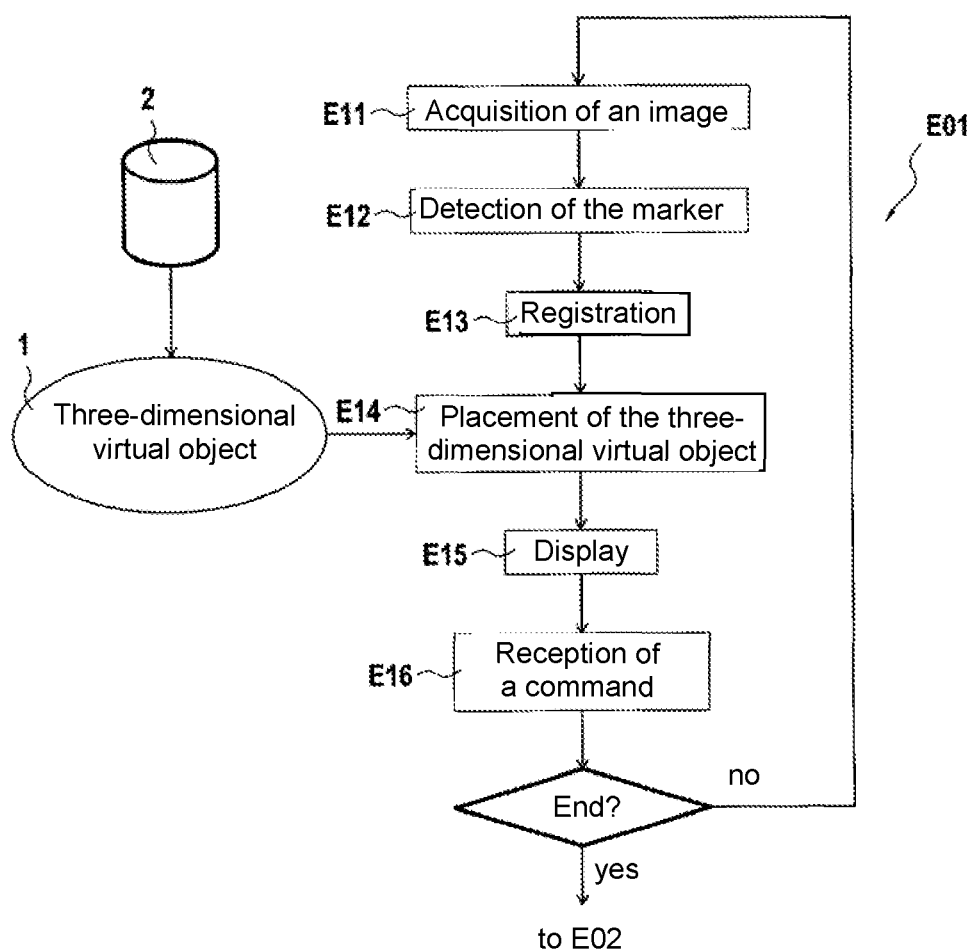

FIG. 2 shows the steps of an adjustment of a three-dimensional virtual object, as performed during step E01 described with reference to FIG. 1.

In a first step E11 a real-world image is acquired, in a step E12 at least a portion of the marker is detected, in a step E13, and the three-dimensional virtual object 1 is then placed in step E14. The steps E11, E12, E13 and E14 are analogous to steps E02, E03, E04 and E05, respectively, described with reference to FIG. 1.

Subsequently, the three-dimensional virtual object is displayed during step E15 (this display can comprise that of the real-world image acquired). The three-dimensional virtual object can be displaced having a low opacity, such that a user can easily see whether the virtual object is actually overlaid, in the virtual world, on the real object in the real world.

This display is implemented from the viewpoint of the image acquisition module used for acquiring the real-world image.

During a step E16, a user command is received for adjusting the three-dimensional virtual object. This adjustment may comprise a displacement, in the virtual world, of the three-dimensional virtual object, or a deformation of the three-dimensional virtual object in the virtual world.

By way of illustration, if the three-dimensional virtual object is a cylinder having a circular base, the radius of the cylinder can be adjusted during the step E16.

It is then possible to repeat steps E11 to E16 if a user considers that the three-dimensional virtual object is not yet adjusted to the real object. Indeed, the adjustment can itself comprise following (or "tracking") of the portion of the marker.

If the adjustment is considered, by the user, to be acceptable, the following step E02 described with reference to FIG. 1 can be performed.

It can be noted that the adjustment step E01 and the sub-steps thereof, E11, to E16, can be performed at any time, and that they can be repeated several times, in particular following one or more performances of steps E02 to E07, described with reference to FIG. 1.

Figure 3:
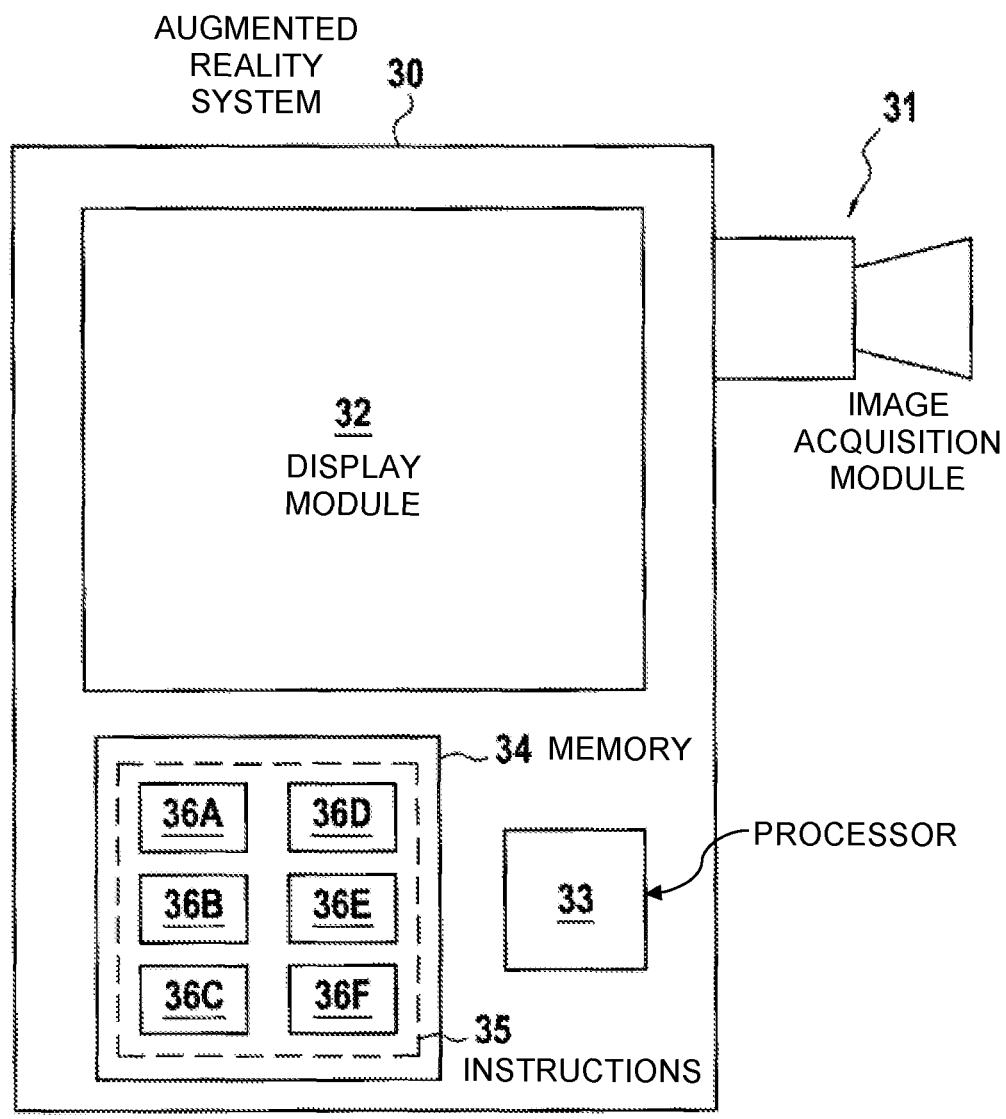

FIG. 3 shows an augmented reality system 30 according to a particular embodiment of the disclosure. The system can in particular perform the steps of the method described with reference to FIGS. 1 and 2.

The system 30 comprises an image acquisition module 31 (for example a camera, a screen-type display module 32, a processor 33, and a memory 34 (i.e. of the non-volatile type). In this case, the memory 34 comprises computer program 35 instructions that can be executed by the processor 33 of the system.

In this case, the instructions comprise:
an instruction 36A for acquiring, by means of the image acquisition module 31, a real-world image on which a real object and at least a portion of a marker linked to the real object are visible,
an instruction 36B for detecting the at least one portion of the marker in the real-world image,
an instruction 36C for registering a virtual world with respect to the real world, on the basis of the detection of the at least one portion of the marker,
an instruction 36D for placing, in the registered virtual world, a three-dimensional virtual object, such that the virtual object is substantially overlaid, in the virtual world, on the real object in the real world,
an instruction 36E for applying a texture on the three-dimensional virtual object,
an instruction 36F for displaying, on the display module 32, at least the texture applied to the three-dimensional virtual object, the display being performed from a viewpoint in the virtual world that corresponds to the position of the image acquisition module in the real world.

Figure 4A:
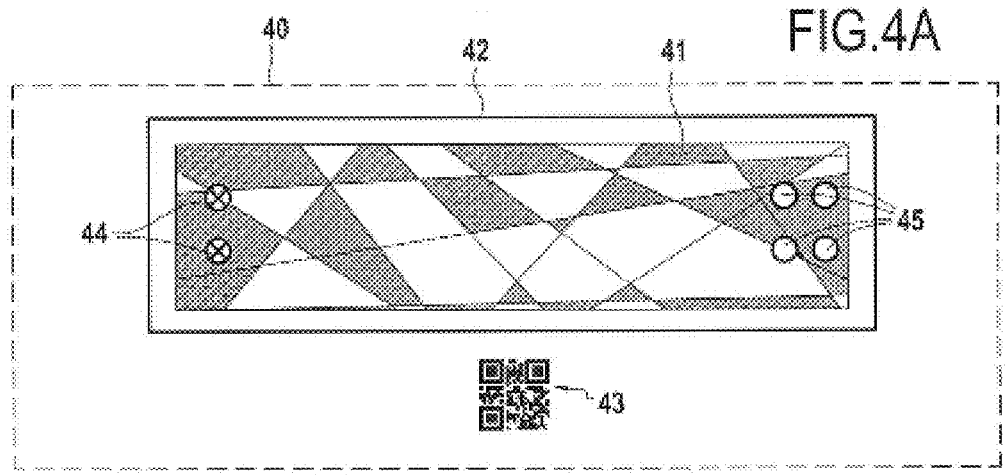

FIG. 4A shows a kit 40 according to an embodiment of the disclosure.

The kit comprises a marker 41 that is provided on a support 42, and information 43 for obtaining a computer program that allows for a method for displaying texture in augmented reality according to an embodiment of the disclosure to be performed.

In this case, the marker 41 is a non-repetitive pattern having a high black-and-white contrast ratio t which can be detected using the Vuforia (registered trade mark) development kit. It can be noted that the corners of the black or white polygons of the marker can be points that are detected for example during step E03 described above, in which a portion of the marker is detected. The points can also be denoted, by a person skilled in the art, as visual nodes.

It can be noted that, in order to detect a portion of the marker, it is possible to detect a number of points that is equal to 3, or between 3 and 20, or between 20 and 50, or between 50 and 100, in order to determine a position of the marker and to be able to perform the registration step.

In this case, the support 42 is a flexible support that can be folded in order to surround an object. In this case, the support 42 comprises means for attaching the support to itself, and more particularly studs 44 and holes 45. In this case, the studs 44 can be inserted into two pairs of holes 45, such that, attached to itself, the support can surround real objects of different diameters.

Of course, the disclosure is in no way limited to the use of studs and holes, and other attachment means can be used, such as adhesives (glue), Velcro (registered trade mark), a loop, a self-blocking strap, etc. It can be noted that a non-repetitive pattern comprises a set of unique portions, and that detecting a sufficient number of points of a portion of the marker makes it possible to locate the portion in the marker.

In this case, the information 43 is of the QR code type, and the reading thereof can make it possible to retrieve a hypertext link to a computer program to download, or even a hypertext link to a catalogue of computer programs or applications for smartphones or graphics tablets.

In order to use the kit, it is possible to link the marker to a real object (by attaching the support to itself), and then for example perform the steps of the method as described with reference to FIG. 1.

Figure 4B:
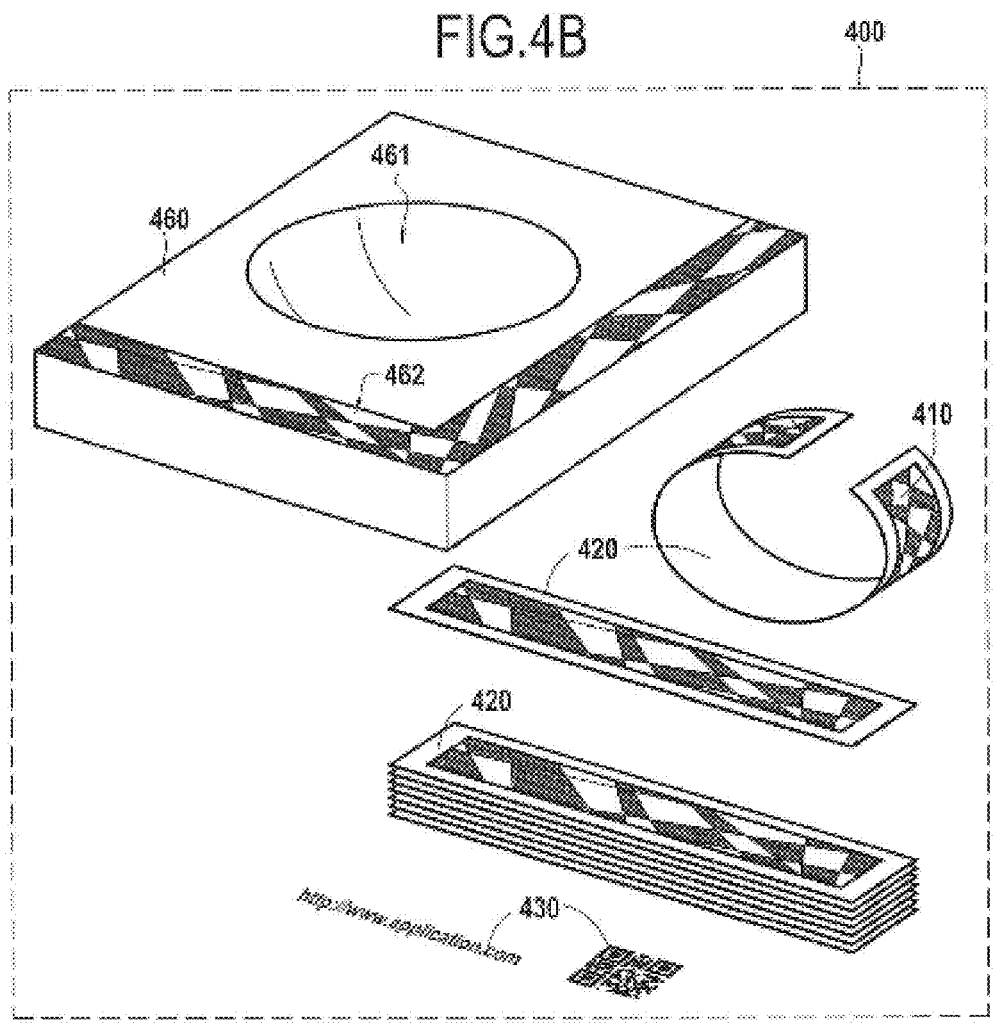

FIG. 4B shows another kit 400 comprising a plurality of supports 420 provided with markers 410. The kit 400 also comprises information 430 for making it possible to obtain a computer program to download in order to implement the method as described above.

The kit 400 also comprises a receptacle 460 for receiving a real object for which the method will be performed, for example that described with reference to FIG. 1. The receptacle 460 comprises a concave portion 461 for receiving an object having a spherical or ovate shape, and a marker 462.

It will be understood that, when a real object is received by the receptacle 460, the object will no longer move, and the position and the orientation thereof will be known from the time when the marker 462 is detected.

Other types of receptacles can be used, in particular non-symmetrical receptacles or receptacles having locating pins, in which the real objects are received so as to have a selected orientation.

FIG. 4C shows another example of means for attaching a support 420 provided with a marker 410. In this example the face of the support opposite that comprising the marker is provided with an adhesive portion 450.

FIG. 4D shows the step in which the marker 410 and the support 420 thereof, shown in FIG. 4C, are adhesively bonded to a surface 470 of a real object, using the adhesive portion 450.

FIG. 4E shows the receptacle 460 of FIG. 4B comprising a real object 463 (which may be comprised in a kit according to an aspect of the disclosure). The real object 463 is ovate in shape. It can be noted that, by placing a real object in the receptacle 460, the marker of the receptacle is linked to the real object.

FIG. 4F shows a variant of the support 420 provided with a marker. In this case, the support 420' is rigid, and it can be attached to a surface 470' by means of a magnetic portion 450' that cooperates with a magnetic portion that is not visible in the figure and is arranged on the face of the support opposite that is provided with the marker. Alternatively, a clamp system may allow for fixing of a rigid support.

Figure 5:
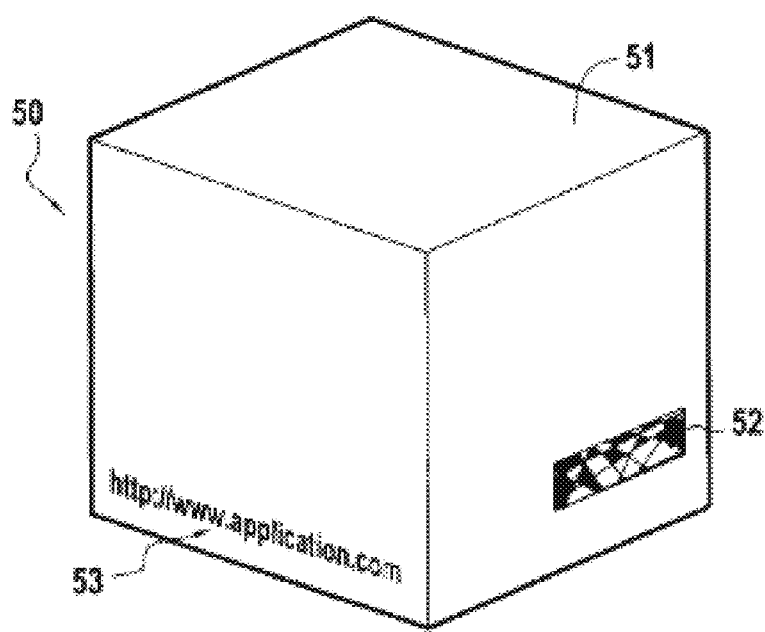
FIG. 5 shows an alternative to the kits of FIG. 4A to 4F, FIGS. 6A, 6B, 6C, 6D, 6E, 6F and 6G schematically show the steps of adjustment and display of texture on a screen.

FIG. 5 shows a variant of the kit shown in FIG. 4A. More precisely, the example of FIG. 5 shows a kit 50 comprising a real object 51 (in the case a cube). A marker 52 and information 53, making it possible to retrieve a computer program capable of performing the steps of a method according to an embodiment of the disclosure, have been placed directly on the real object.

FIG. 6A to 6G show the steps of a method for displaying texture in augmented reality, such that a user can observe the texture.

Figure 6A:
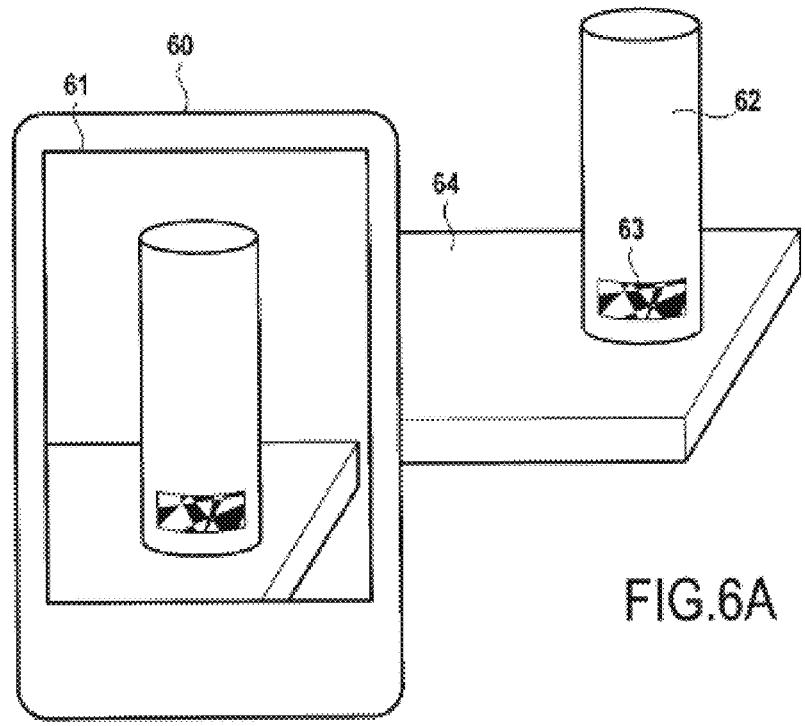

FIG. 6A shows a system 60 that is of the touchpad type and comprises a screen 61. Although the elements thereof are not shown in the figure, the system 60 can be analogous to the system 30 described with reference to FIG. 3. In particular, the system 60 comprises a camera on the back of the face comprising the screen.

In this case, the camera films a scene, acquiring images visible on the screen 61. The filmed scene comprises a real object 62 (in this case a cylinder), a portion of a marker 63 that surrounds the cylinder, and a support 64 on which the cylinder is placed.

An adjustment step can be performed, and this step comprises in particular displaying a virtual object so as to be overlaid on the real object (step E15 in FIG. 2). Thus, in FIG. 6B, a virtual object 65 has been displayed, which object appears, on the screen 61, as though it were substantially overlaid on the real object 62. The display of the virtual object is performed after detection of a portion of the marker on the acquired image, as described with reference to FIG. 2.

Figure 6B:
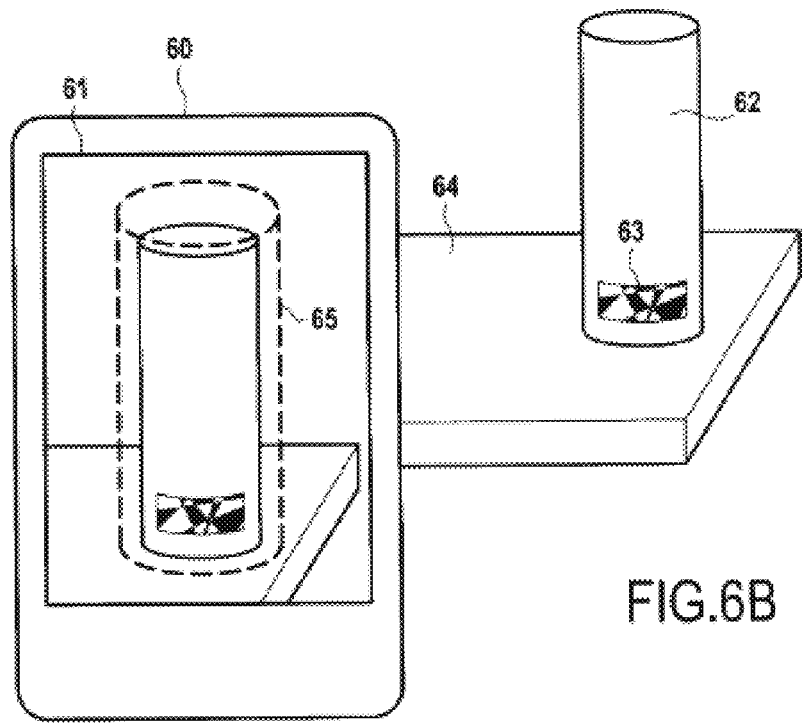
Figure 6C:
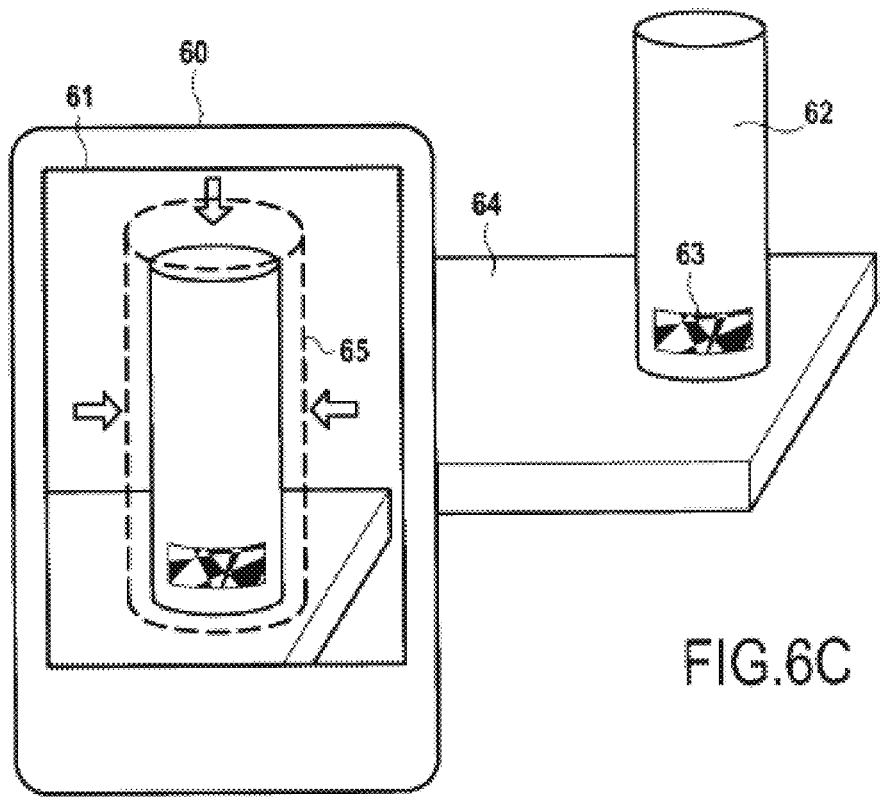

It should be noted that, in FIG. 6B, the three-dimensional virtual cylinder has a diameter that appears as though it were greater than that of the real object, and a height that also appears as though it were greater than that of the real object. A user may therefore wish to modify the diameter and the height of the three-dimensional virtual object. These modifications are shown by arrows in FIG. 6C.

Figure 6D:
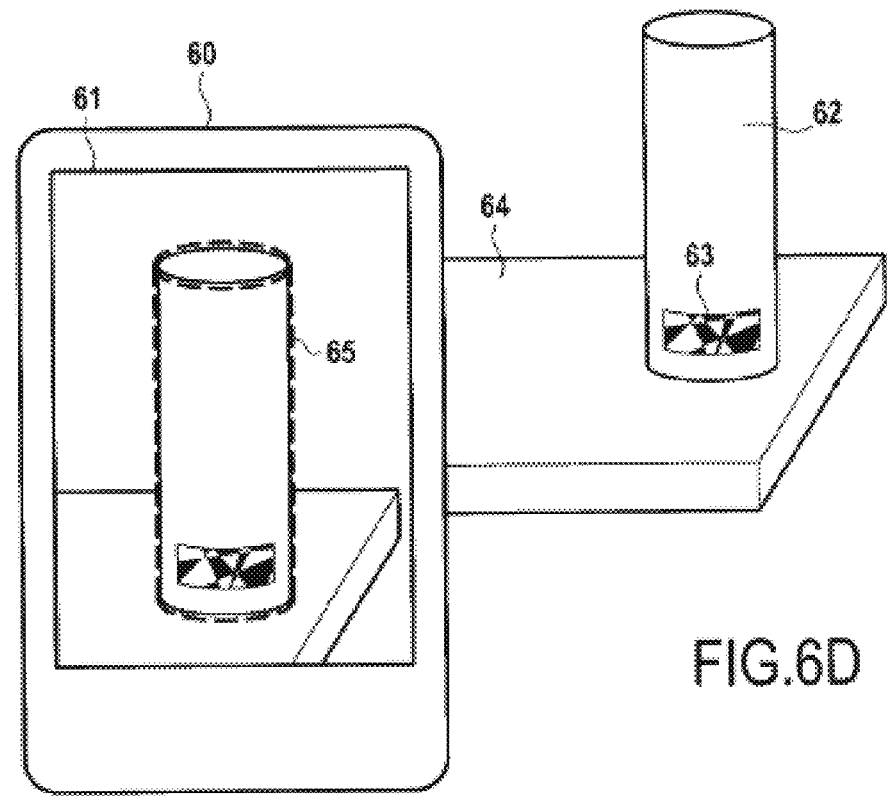

FIG. 6D shows the result of the adjustment step, comprising a three-dimensional virtual object 65 that is indeed overlaid on the real object in the image displayed on the screen 61.

Figure 6E:
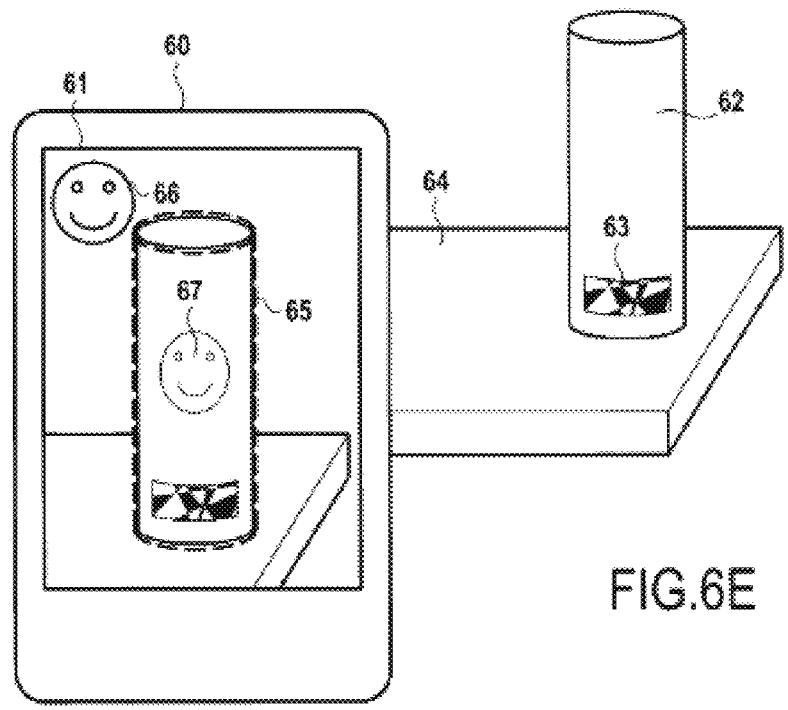

FIG. 6E shows a texture 66 that is to be applied to the three-dimensional virtual object 65.

It can be noted that, in this example, the texture is a two-dimensional image. All the examples described in the present application can use two-dimensional textures.

The FIG. 6E also shows the texture 67 applied to the three-dimensional virtual object 65. Since the three-dimensional virtual object 65 is a cylinder, the texture appears, on the screen, as though it had been deformed in order to fit the shape of the cylinder. The texture is placed in a predefined location of the three-dimensional virtual object.

The method can then comprise a step of drawing the real object 62. For this purpose, it is no longer necessary to display the virtual object 67, as shown in FIG. 6F.

Figure 6F:
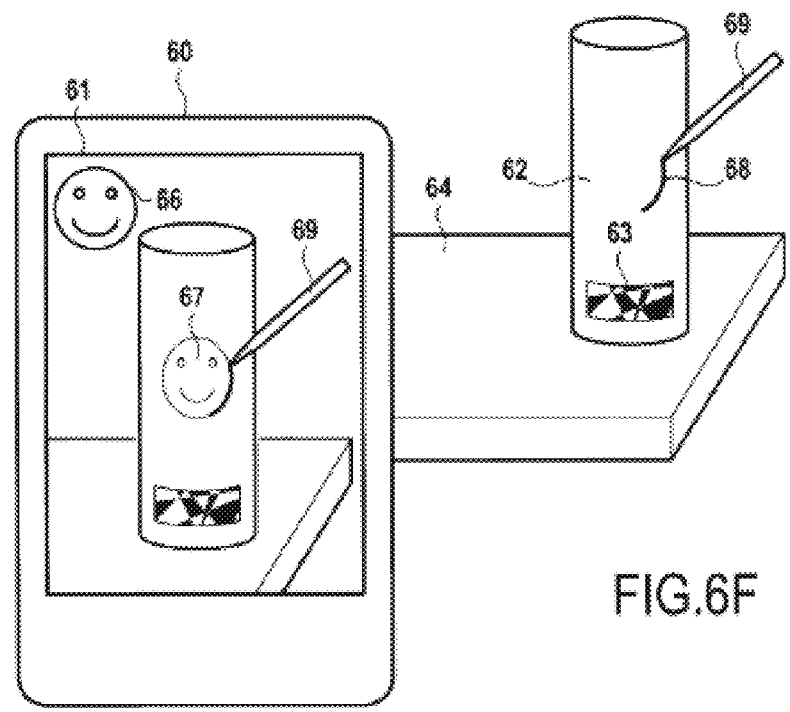

In FIG. 6F, a user who is observing the screen 60 can use a writing tool 69 (for example a felt pen) in order to reproduce the texture on the real object 62. The start of the contour is shown by the line 68 in the figure. Of course, since the image acquired by the camera is continuously refreshed, the user sees the contour and the texture becoming overlaid.

Figure 6G:
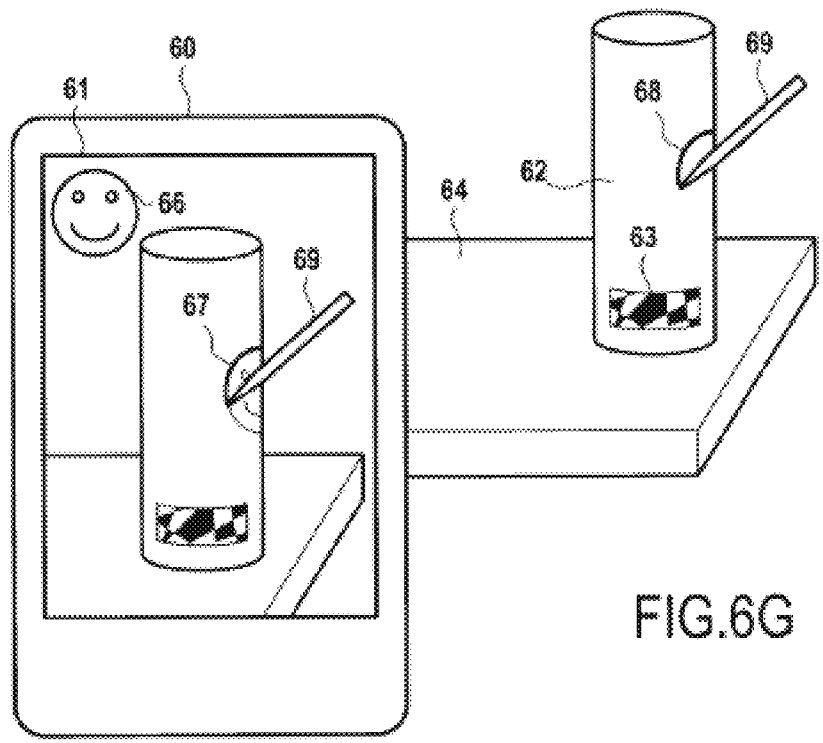

Subsequently, in order to more easily draw other parts 68 of the texture 67, the user can turn the support 64 and cause the real object 62 and the marker 63 to rotate. Thus, and as shown in FIG. 6G, another portion of the marker can be detected.

The new portion of the marker that can be viewed by the camera makes it possible to take account of the rotation of the real object in order to subsequently display a texture applied to a three-dimensional virtual object that has undergone the same rotation. It will be noted that this results from using a non-repetitive marker. Each portion of the marker is associated with a particular portion of the real object in the real world, which allows for a new registration to be made. In all the embodiments described in the present application, each portion (a portion comprises for example a predefined number of particular points) of the marker can be associated with a particular position of the real object in the real world.

Indeed, by processing new images acquired by the camera, the method can endure movements of the object and/or of the camera, since a portion of the marker remains in view of the camera.

Figure 7:
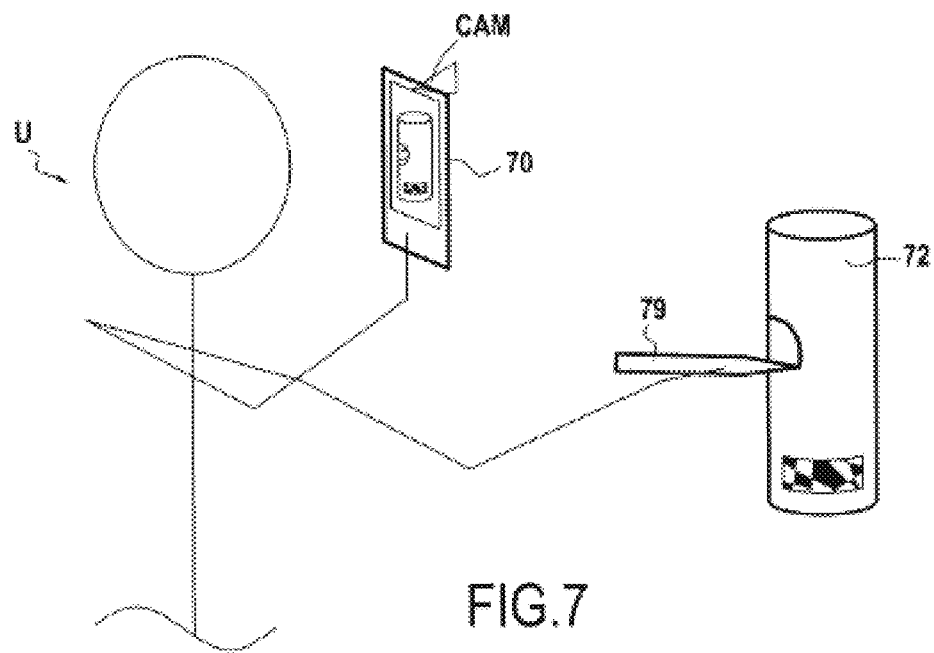
FIG. 7 is a view of an embodiment of the disclosure, showing the user.

FIG. 7 shows a user U holding a system 70 of the smartphone type, provided with a camera CAM. At the same time, the user manipulates a writing tool 79 in order to draw on the cylinder 72 while looking at the screen of the smartphone 70 on which the texture is displayed. This embodiment may have been used for performing the method illustrated in FIG. 6A to 6G described above.

FIG. 8 shows an embodiment in which augmented reality glasses 80 are used. In this case, an object 82 (a cap) is observed, on which object a marker 83 is fixed. Only one texture 87 is displayed on the glasses, and this texture represents a flower. The texture 87 is deformed due to having been applied to a three-dimensional virtual object in the shape of a cap. More precisely, since the flower is intended to be displayed as though it were between the peak and the upper part of the cap, the stem thereof is displayed as though broken.

In order to facilitate understanding of the FIG. 8, the flower 87' has also been shown in dashed lines, which flower could be drawn on the object 82.

It will be noted that, in this example, it is not necessary to also display the image acquired by a camera (which has not been shown here).

FIGS. 9A and 9B show the use of two markers 91 and 92 (or a marker and an additional marker) that surround a cylindrical object having a circular base 90. The two markers are placed at the two ends of the cylinder 90.

These figures also show, by way of a mesh, the three-dimensional virtual object overlaid on the real object, and the texture 93 applied to the three-dimensional virtual object. In FIG. 9A, the mesh 94 is substantially straight and corresponds to the two portions of the marker that will be visible on the acquired image. In FIG. 9B, the real object has been twisted, causing rotation of the markers. The two different portions of the marker are then detected on the acquired image, and it is possible to perform an adjustment of the three-dimensional virtual object in order to take account of the respective position of the two markers. This is represented, in FIG. 9B, by a deformed mesh 94 and a deformed texture 93.

The embodiments described above make it possible to achieve a preview of a drawing on a real object, in a manner that makes it possible to make it easier to create a drawing on the real object.

The invention claimed is:

1. A kit comprising:
   a receptacle for receiving a real object on which a marker is provided; and
   information for obtaining a computer program to execute a method for applying texture in augmented reality, the method comprising:
   acquiring, by an image acquisition module, a real-world image on which the real object and at least one portion of the marker linked to the real object are visible;
   detecting the at least one portion of the marker in the real-world image;
   registering a virtual world with respect to the real world, on the basis of the detection of the at least one portion of the marker;
   placing a three-dimensional virtual object in the registered virtual world, such that the virtual object is substantially overlaid, in the virtual world, on the real object in the real world;
   applying a texture on the three-dimensional virtual object,
   displaying at least the texture applied to the three-dimensional virtual object, the display being performed from a viewpoint in the virtual world that corresponds to the position of the image acquisition module in the real world; and
   displaying the real-world image, the texture applied to the three-dimensional virtual object being displayed in such a manner to be overlaid on the real-world image being displayed,
   wherein the marker is a non-repetitive pattern having a high black-and-white contrast ratio with a black intensity difference of at least 70 points.

2. The kit according to claim 1, wherein the three-dimensional virtual object is selected from a library of three-dimensional virtual objects.

3. The kit according to claim 1, wherein the method further comprises a preliminary operation of adjusting the three-dimensional virtual object.

4. The kit according to claim 3, wherein the adjusting is implemented by receiving a command from a user.

5. The kit according to claim 1, wherein the detecting the at least one portion of the marker includes detecting a predefined number of particular points of the at least one portion of the marker.

6. The kit according to claim 5, wherein the predefined number of particular points is 3, or between 3 and 20, or between 20 and 50, or between 50 and 100, or greater than 50.

7. The kit according to claim 1, wherein the marker is fixed to the real object or forms part of the real object.

8. The kit according to claim 1, wherein the step applying the texture involves applying the texture to the three-dimensional virtual object in a zone that is separate from a zone containing the marker in the real world.

9. The kit according to claim 1, wherein the texture is applied to a predefined portion of the three-dimensional virtual object.

10. The kit according to claim 1, wherein at least a portion of an additional marker linked to the real object is visible on the real-world image, and the method further comprises:
- detecting the at least one portion of the additional marker in the real-world image; and
- adjusting the three-dimensional virtual object according to the detection of the at least one portion of the additional marker.

11. The kit according to claim 1, wherein the detecting the marker involves detecting the marker provided on a support, and the marker provided on the support is linked to the real object.

12. The kit according to claim 11, wherein the support is flexible and attached to an object.

13. The kit according to claim 12, wherein, the marker is visible around the real object.

14. The kit according to claim 11, wherein the support is rigid and attached to an object.

15. An augmented reality system, comprising:
- a receptacle for receiving a real object on which a marker is provided,
- a real world image acquisition module,
- a display module,
- at least one processor, and
- a memory including instructions configured to be executed by the at least one processor for:
  - acquiring, by the real world image acquisition module, a real-world image on which the real object and at least one portion of the marker linked to the real object are visible,
  - detecting the at least one portion of the marker in the real-world image,
  - registering a virtual world with respect to the real world, on the basis of the detection of the at least one portion of the marker,
  - placing a three-dimensional virtual object in the registered virtual world, such that the virtual object is substantially overlaid, in the virtual world, on the real object in the real world,
  - applying a texture on the three-dimensional virtual object,
  - displaying at least the texture applied to the three-dimensional virtual object, the display being performed from a viewpoint in the virtual world that corresponds to the position of the real world image acquisition module in the real world, and
  - displaying the real-world image, the texture applied to the three-dimensional virtual object being displayed in such a manner to be overlaid on the real-world image being displayed,
- wherein the marker is a non-repetitive pattern having a high black-and-white contrast ratio with a black intensity difference of at least 70 points.

16. A kit comprising:
a real object provided with a marker; and
information for obtaining a computer program to execute
a method for applying texture in augmented reality, the method comprising:
- acquiring, by an image acquisition module, a real-world image on which the real object and at least one portion of the marker linked to the real object are visible;
- detecting the at least one portion of the marker in the real-world image;
- registering a virtual world with respect to the real world, on the basis of the detection of the at least one portion of the marker;
- placing a three-dimensional virtual object in the registered virtual world, such that a virtual object is substantially overlaid, in the virtual world, on the real object in the real world;
- applying a texture on the three-dimensional virtual object,
- displaying at least the texture applied to the three-dimensional virtual object, the display being performed from a viewpoint in the virtual world that corresponds to the position of the image acquisition module in the real world; and
- displaying the real-world image, the texture applied to the three-dimensional virtual object being displayed in such a manner to be overlaid on the real-world image being displayed,
- wherein the marker is a non-repetitive pattern having a high black-and-white contrast ratio with a black intensity difference of at least 70 points.

* * * * *

UNITED STATES PATENT AND TRADEMARK OFFICE
CERTIFICATE OF CORRECTION

PATENT NO. : 11,727,647 B2
APPLICATION NO. : 16/622775
DATED : August 15, 2023
INVENTOR(S) : Franck Rolion and Etienne Roudaut Page 1 of 1

It is certified that error appears in the above-identified patent and that said Letters Patent is hereby corrected as shown below:

In the Claims

In Claim 8, Column 12, Line 61, delete "step applying" and insert --"applying"--.

Signed and Sealed this
Third Day of October, 2023

Katherine Kelly Vidal
*Director of the United States Patent and Trademark Office*